April 9, 1940.  F. MASON ET AL  2,196,606
VARIABLE SPEED DRIVE
Original Filed Oct. 23, 1933   3 Sheets-Sheet 1

INVENTORS
Frank Mason
George T. Pfleger
BY John F. Law
ATTORNEY

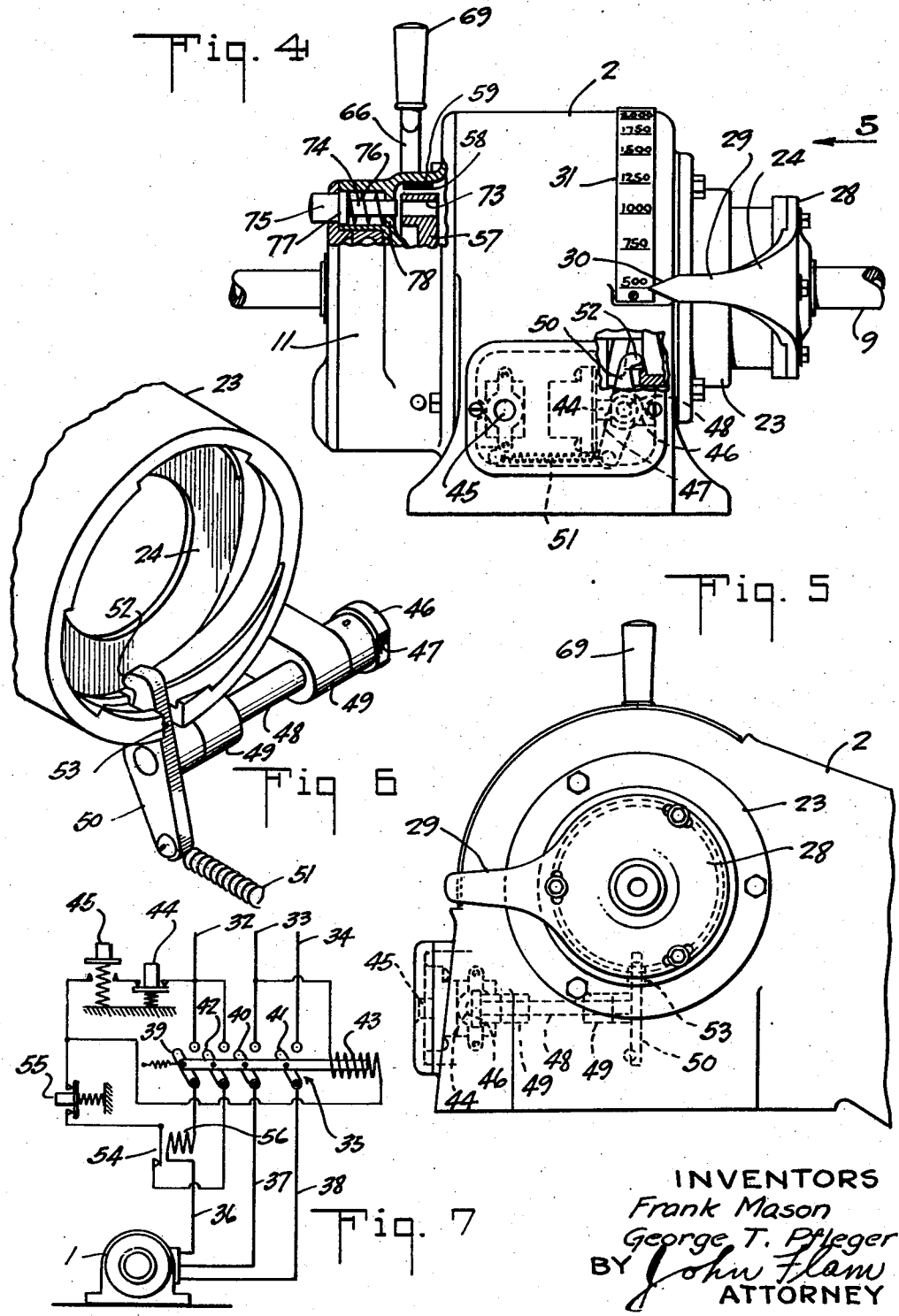

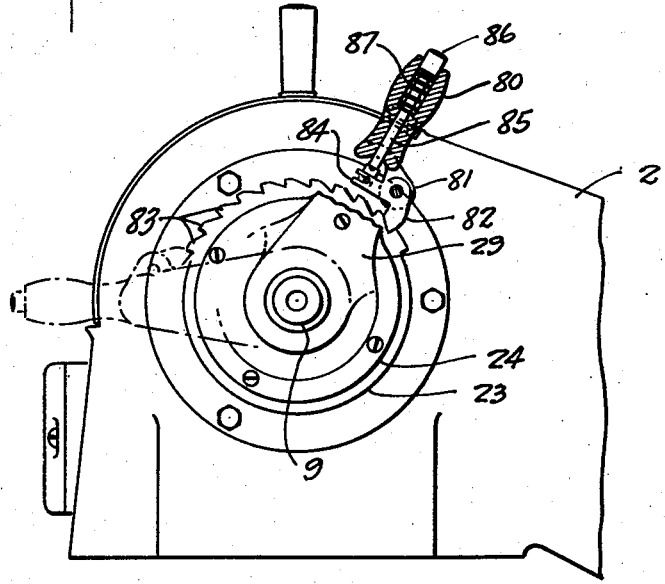

Patented Apr. 9, 1940

2,196,606

UNITED STATES PATENT OFFICE 2,196,606

VARIABLE SPEED DRIVE

Frank Mason, Chicago, Ill., and George T. Pfleger, Los Angeles, Calif., assignors to U. S. Electrical Motors, Inc., a corporation of California Application October 23, 1933, Serial No. 694,792
Renewed February 8, 1938

25 Claims. (Cl. 74—230.17)

This invention relates to a power transmission device for loads requiring varying speeds, such as wood or metal working machinery.

More particularly, the invention relates to an electric motor drive, connected to a load by a belt and pulley drive between the load shaft and the motor shaft, at least one of the pulley structures on the shafts having an adjustable effective diameter.

Such a pulley structure can include a pair of sections, each having opposed inclined faces, converging toward the axis and forming a seat for a wedge-shaped belt. In order to cause the belt to engage the sections at different radial distances from the axis, the sections are made relatively axially adjustable. In this way, the inclined faces can be brought closer together, causing the belt to be urged radially outwardly to produce an increased effective diameter; or they can be separated, causing the belt to be in contact with the faces at a shorter radial distance, to produce a reduced effective diameter.

Ordinarily, these adjustments of pulley diameters cannot be effected while the mechanism is at a standstill. This is apparent because any attempt for example to bring the sections together at standstill is opposed by the belt being wedged between the two sections. When the belt is moving, however, the resultant of the forces acting on the belt, due to belt tension and that imposed by the sections, is in such direction as to permit the outward movement of the belt. Since one of the two adjustable pulley structures in the system must have its diameter increased irrespective of the direction of speed variation, it is apparent that the necessity for adjusting the diameters only during operation of the mechanism is essential.

It is one of the objects of this invention to make it possible to adjust for the desired pulley diameters or speed, prior to the operation of the system; and to cause the system to respond to the pre-set adjustment during the initial period of operation. In other words, an adjusting device is used, which is ineffective to adjust the pulley diameters, until after the mechanism is set into operation, at which time, the adjustment becomes automatically effective.

It is another object of this invention to ensure that the ratio of transmission at which the load can be operated at the start, is definitely determined. For example, for loads of the character stated, the apparatus is preferably so arranged that the load is started at or near minimum speed.

It is still another object of this invention to provide a brake mechanism such that automatically upon application, the electric motor is deenergized.

This invention possesses many other advantages, and has other objects which may be made more easily apparent from a consideration of several embodiments of the invention. For this purpose there are shown a few forms in the drawings accompanying and forming part of the present specification. These forms shall now be described in detail, illustrating the general principles of the invention; but it is to be understood that this detailed description is not to be taken in a limiting sense, since the scope of the invention is best defined by the appended claims.

Referring to the drawings:

Fig. 4 is a side elevation taken from the direction of the arrow 4 of Fig. 1;

Fig. 5 is a fragmentary end elevation taken from the plane 5—5 of Fig. 4;

Fig. 6 is a pictorial view of a detail showing the manner of operating the electrical interlock;

Fig. 7 is a schematic wiring diagram of the power unit;

Fig. 8 is a fragmentary end elevation, partly in section similar to Fig. 5, but showing a modified form of control arm; and Fig. 9 is a fragmentary side elevation of the modified form shown in Fig. 8.

Figure 2:
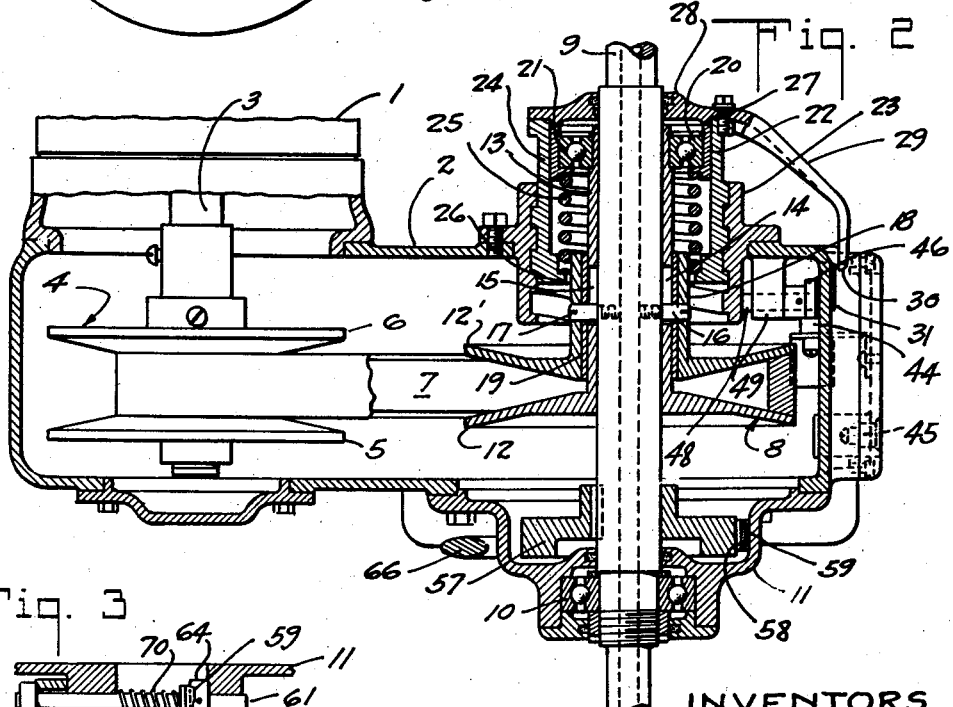
Fig. 2 is a view mainly in section taken along plane 2—2 of Fig. 1.

In general, the system includes a variable ratio power transmission device, the power for which is obtained by the aid of an electric motor 1 (Figs. 2 and 7). This electric motor 1 is shown as supported on one wall of a casing 2 within which are supported the elements of the variable ratio transmission device. The shaft 3 of the motor (Fig. 2) is shown as extending into the casing 2 and carrying an adjustable pulley structure 4. This adjustable pulley structure includes an axially fixed section 5 and an axially movable section 6. Section 6 is urged against section 5 resiliently in a manner which is now well understood in this art. A belt 7 of wedge shaped cross section is in contact at its opposite sides with the two sections 5 and 6.

The belt 7 is also in contact with the driven pulley structure 8. This pulley structure is mounted on a driven shaft 9 having one end projecting out of the casing 2 for appropriate connection to a load. As viewed in Fig. 2, the lower end of the shaft 9 is supported in an appropriate ball bearing structure 10 held in a removable cap 11 of the casing 2. The details of this bearing support may be conventional and no further explanation is therefore necessary.

The section 12 of the pulley structure 8 is adjustable with respect to a pulley section 12' which is axially fixed to the shaft 9. For example, pulley section 12 can have an elongated hub 13 provided with diametric slots 14, 15. Co-operating with these slots are a pair of radial pins 16 and 17 which serve to hold the hub 18 of the fixed section 12' to the shaft 9. The hub 13 of the movable section 12 is slidable in the annular space between the hub 18 and shaft 9. The limits of axial adjustment are prescribed by the length of the slots 14 and 15 through which the pins 16 and 17 extend. Furthermore, there is shown in the present instance a lining sleeve 19 for hub 18 of appropriate material to permit easy sliding of section 11 with respect to section 12. The upper end of the hub 13 is supported in an appropriate ball thrust bearing structure 20. The structure 20 thus supports the shaft 9 rotatably as well as serving, by axial adjustment, to move the section 12 in an axial direction. Thus the outer race 21 of ball bearing structure 20 is accommodated in a sliding collar 22. The mode of axially adjusting this collar will be hereinafter described.

If considered essential, additional keys and splines may be provided for the sections 12 and 12' to transmit the required amount of torque to shaft 9.

When pulley section 12 approaches pulley section 12' the ratio of transmission is reduced since the belt 7 is forced radially outward between the sections 12 and 12'. This also causes the belt 7 to move radially inwardly between sections 5 and 6 of the driving pulley structure 4, causing them to be wedged apart against the action of a resilient element such as a compression spring. In order that belt 7 may be kept in alinement section 5 is axially fixed and section 6 is resiliently urged toward section 5. Therefore, as section 12 moves upwardly as viewed in Fig. 2, the section 6 is also urged upwardly by the wedging action of belt 7.

Conversely, when section 12 is moved away from section 12', the belt 7 is allowed to move radially inwardly between sections 12 and 12' causing a decrease in the effective pulley diameter and a corresponding increase in the ratio of transmission. Such an expansion of section 12 and 12' permits section 6 of the driving pulley 4 to be urged downwardly toward section 5 and causes the belt 7 to move radially outwardly, thereby keeping the belt 7 in proper frictional contact with all of the pulley sections. The mode in which this ratio of transmission is adjusted will now be described. The casing 2 carries an internally threaded boss 23. In this boss a barrel member 24 is threaded. Preferably, a multiple thread structure is provided for lending strength to the structure, the threads being quite steep in pitch. In this way a small angular movement of barrel 24 in boss 23 causes a correspondingly large axial movement. Within this barrel is a resilient member such as spring 25 exerting an axial force against collar 22 which is slidable inside of barrel 24. The lower end of spring 25 acts against a stationary abutment such as a flange 26 at the inner end of the barrel 24.

The spring 25 acts constantly to urge the collar 22 against an abutting surface 27 formed on the cap 28 of barrel 24. It is apparent that by rotating barrel 24, the abutments 26 and 27 are moved axially, whereby the spring 25 and collar 22 are correspondingly moved to adjust pulley structure 8. One manner in which this rotation of barrel 24 can be effected is by the aid of an arm 29 (Figs. 2, 4 and 5) shown in this instance as integral with the cap 28. This arm 29 can also be provided with a pointer end 30 (Figs. 2 and 4) cooperating with a stationary speed indicating scale 31 mounted on the periphery of casing 2. For the position shown, the barrel 24 is in one of its extreme positions corresponding to minimum ratio of transmission mechanism. In other words, pulley section 12 is at its closest position to pulley section 12', causing belt 7 to be at its extreme radial position from the axis of shaft 9.

The provision of the sliding collar 22 and spring 25 makes possible a predetermination of the ratio of transmission before the motor 1 is started. While the apparatus is at a standstill, the movement of section 12 towards section 12' is prevented because of the fact that belt 7 is wedged between the two sections. However, as soon as the apparatus is set into motion, the combination of forces, (that is, friction between belt and pulleys, direction of belt pull, and axial force between the sections,) is such that this adjustment can take place. In the present instance, even with the apparatus at a standstill the barrel 24 can be moved upwardly. This causes, during such standstill period, a temporary compression of spring 25, collar 22 remaining stationary and abutting surface 27 moving upwardly away from the collar 22. As soon as the apparatus is started, however, the spring 25 separates until the collar 22 abuts the surface 27.

The arrangement is such that starting of motor 1 cannot be accomplished until the barrel 24 corresponds to a position of minimum ratio of transmission to shaft 9. This is done because shaft 9 may be coupled to such loads as student lathes for woodworking or the like, where it is essential that the speed of the lathe be at a minimum during the starting period.

The starting system for motor 1 is illustrated in Fig. 7. It is there shown as a three phase motor having mains 32, 33 and 34 leading to a source of alternating current power. These mains are controlled by an electro-magnetically operated switch 35 to complete connections to the leads 36, 37 and 38 of the motor 1. Switch 35 has four contactors 39, 40, 41 and 42, the first three of which serve to complete the motor circuit. The other contact device 42 serves to complete a holding circuit as will now be described.

The switch 35 is shown in this instance as operated by an electromagnet 43 which has a circuit completed between the mains 32 and 33 through the starter buttons 44 and 45. Starter button 45 is urged resiliently to open position, and starter button 44 is urged resiliently to closed position, but is prevented from closing, by a mechanism to be hereinafter described, except under certain conditions. In order to start the motor 1, therefore, starter button 44 must be in the position shown in Fig. 7, and starter button 45 must be depressed. Starter button 45 is arranged to be manually operated from outside of casing 2 as illustrated most clearly in Figs. 4 and 5. Starter button 44, however, is enclosed inside of the casing to prevent unauthorized operation. This starter button is operated by a cam 46 (Figs. 2, 4, 5 and 6). This cam has a flattened portion 47 which can permit button 44 to move to closed position. However, when the circular portion of cam 46 is active, the button 44 is depressed and the motor 1 can not be started.

To accomplish this result, cam 46 is mounted on a shaft 48 journaled in appropriate lugs 49. The other end of shaft 48 carries a lever 50. One end of lever 50 is acted upon by a tension spring 51 to rotate lever 50 for normally holding the round portion of cam 46 against button 44.

The opposite end of lever 50 carries a projection 52 accommodated in a slot 53 in boss 23, and arranged to be contacted by the inner end of the barrel 24. Until barrel 24 moves to the extreme position shown in Fig. 2, corresponding to minimum ratio of transmission, the button 44 is urged to open position by the circular portion of cam 46. However, as soon as the barrel 24 reaches a position corresponding to minimum ratio of transmission, the lever 50 is moved sufficiently to bring the flat portion of cam 46 opposite button 44 and the motor can then be started by pressing button 45.

Once the motor 1 is started, however, the circuit through electromagnet 43 stays completed through a holding circuit including main 3, contact element 42, overload switch 54, and stop button 55. To stop the motor, button 55 can be depressed for opening this holding circuit. Similarly, the overload coil 56 in connection 36 can also open the circuit by opening the overload switch 54.

Figure 1:
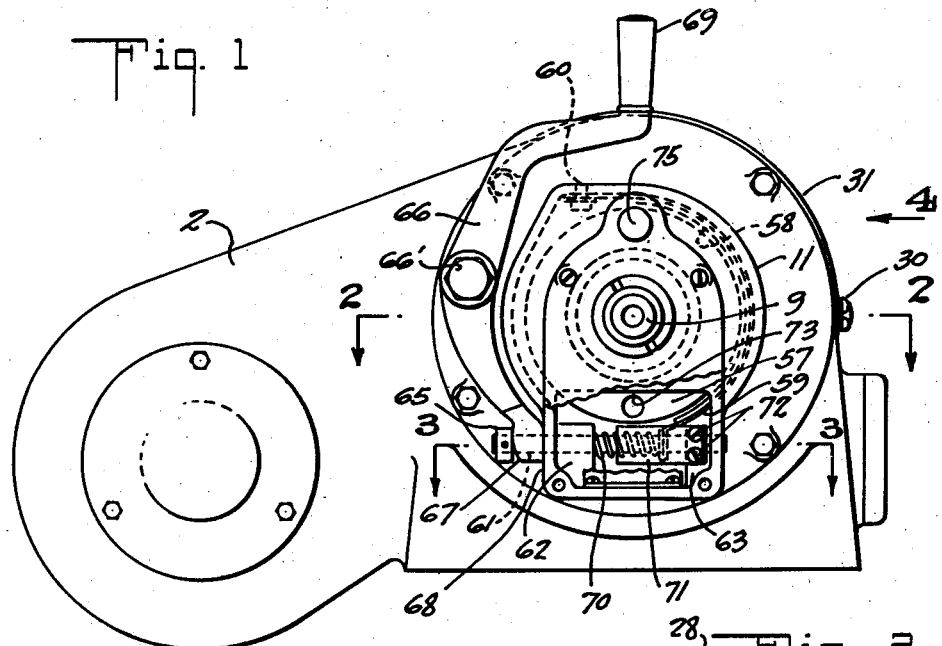
Figure 1 is an end elevation from the brake applying end of the power unit, embodying the invention; a portion of the frame being broken away.
Figure 3:
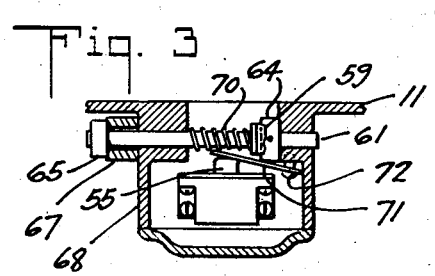
Fig. 3 is a detail section taken along the plane 3—3 of Fig. 1.

In the present instance the stop button 55 is arranged to be operated in response to the operation of a brake. This can be explained in connection with Figs. 1, 2 and 3.

Thus shaft 9 carries a brake drum 57. Cooperating with this brake drum is a brake band 58 supported on a flexible strip 59. One end of this flexible strip is permanently attached to the casing as by screw 60. The other end is carried on a transverse pull rod 61. This pull rod is guided in bosses 62 and 63 formed integral with the cap 11. This rod 61 has a collar 64 on which the flexible strip 59 is supported. Exteriorly of the casing 2 the rod 61 carries a collar 65. A brake lever 66 is pivotally supported on a pin 66' and has a fork 67 engaging between the collar 65 and a flat portion 68 of the cap 11. When the brake lever 66 is pulled toward the right as viewed in Fig. 1 by the aid of the handle 69, the pull rod 61 is pulled to the left against the action of compression spring 70, and the brake is applied. Collar 64, furthermore, in this motion toward the left acts on a strip 71 (Figs. 1 and 3) urging it against stop button 55 for causing the holding circuit to be interrupted. One end of this strip 71 is anchored by the aid of screws 72.

At times it may be necessary to hold shaft 9 stationary so that coupling collars or clutches or the like may be appropriately attached to it. In order to effect this result brake drum 57 may be provided with a series of apertures 73 (Fig. 4). These form recesses for a stopping pin 74 slidable into any one of the recesses 73 as by pushing its externally projecting portion 75 on the outside of the casing. This pin 74 is normally held in disengaging position as by the aid of the spring 76. One end of the spring 76 engages the enlargement or collar 77 of the pin 74 and the other end abuts against the stationary wall 78 in cap 11. If desired, the pin 74 can be so arranged that it must be turned through a slight angle before it can be moved axially to prevent accidental movement of the pin 76 inwardly.

Referring to the modified form shown in Figs. 8 and 9, an electric motor is supported on a casing 2, as before. Adjustable pulley structures connected by a V-belt, are supported in bearings, one of which is mounted in a sliding collar against a spring within a threaded barrel 24, all as previously described. The arm 29 for rotating barrel 24 is, in this form, provided with locking mechanism to prevent rotation of the latter as a result of any force exerted upon it by the spring 25.

Such a locking mechanism for holding the barrel 24 against undesired axial motion, can be of any convenient form, such as a friction shoe, or a spring pressed locking pin. In the present instance however, the mechanism is shown as a pawl and ratchet device. Thus this ratchet mechanism includes an arm 29 which carries a handle or boss 80 and has integral ears 81 which pivotally support a pawl 82. Pawl 82 engages ratchet teeth 83 formed on a portion of the exterior surface of boss 23, these teeth being of sufficient width to accommodate the pawl as it is carried outwardly by the axial movement of barrel 24 (Fig. 9). Pawl 82 has a bell crank extension 84 which is engaged by a rod 85 slidable within handle 80. Rod 85 has a thumb button 86 at its outer end and is urged outwardly by compression spring 87 seated within a counterbore in handle 80. The arrangement is such that the ratchet will oppose any tendency of barrel 24 to turn in boss 23 due to the spring 25 forcing it out against the saw threads.

Figs. 8 and 9 show the mechanism set for maximum speed of the driven shaft. Rotating barrel 24 in a counterclockwise direction to the position indicated by broken lines which will decrease the speed, will not be opposed by the ratchet arrangement. The barrel may not be rotated in the opposite direction, however, to increase the speed without depressing thumb button 86 and disengaging pawl 82 from teeth 83.

We claim:

1. In a variable diameter pulley structure, a pair of relatively axially adjustable sections having inclined faces, forming by adjustment, variable effective pulley diameters, means for adjusting the axial position of one of the sections, comprising a resilient member, exerting a force in a direction axial to the said section, an adjustable member acting on one end of the resilient member, and a support guided for movement in said adjustable member for the said section, the other end of the resilient member urging said support in its guide.

2. In a variable diameter pulley structure, a pair of relatively axially adjustable sections having inclined faces, forming by adjustment, variable effective pulley diameters, means for adjusting the axial position of one of the sections, comprising a compression spring coaxial with said section, an axially adjustable barrel for the spring, one end of the spring being in contact with the barrel, and a thrust bearing structure for the said section and axially movable in the barrel, the said bearing structure being in contact with the other end of the spring, and arranged to be urged against an abutting surface of the barrel.

3. In a variable diameter pulley structure, a pair of relatively axially adjustable sections having inclined faces, forming by adjustment, variable effective pulley diameters, means for adjusting the axial position of one of the sections, comprising a barrel having an external thread for adjusting it in an axial direction, a compression spring in the barrel, and a thrust bearing for said section in the barrel and urged by the spring toward an abutting surface in the barrel.

4. In a variable diameter pulley structure, a pair of relatively axially adjustable sections having inclined faces, forming by adjustment, variable effective pulley diameters, an axially movable member for mechanically moving one of said sections, and means for determining the adjusting movement of said member; comprising means forming an adjustable abutment member, means for adjusting the position of said abutment member, and resilient means urging said axially movable member into contact with said abutment member.

5. The combination as set forth in claim 4, in which the means forming an adjustable abutment member is provided with another abutment against which the other end of the resilient means acts.

6. In a system of the character described, an adjustable ratio power transmission device, an electric motor for supplying power to said device, and means for insuring that the device is set for a predetermined ratio before the electric motor can be started, comprising means for connecting said electric motor to a source of power supply, releasable locking means for preventing the operation of said connecting means, and means actuated when said device is set for said predetermined ratio for releasing said locking means.

7. In a system of the character described, an adjustable ratio power transmitting device including an adjustable pulley structure having a pair of sections with opposed inclined faces, an axially adjustable member for causing one of the sections to move axially to a predetermined position, an electric motor in driving relation to said power transmitting device, means for connecting said motor to a source of power supply, releasable locking means for preventing the actuation of said connecting means, and means actuated when said axially adjustable member reaches a definite axial position corresponding to a definite ratio of transmission, for releasing said locking means.

8. In a system of the character described, an adjustable ratio power transmitting device including an adjustable pulley structure having a pair of sections with opposed inclined faces, an axially adjustable member for causing one of the sections to move axially to a predetermined position, an electric motor in driving relation to said power transmitting device, means for connecting said motor to a source of power supply, releasable locking means for preventing the actuation of said connecting means, and means actuated when said axially adjustable member reaches a position corresponding to a minimum speed ratio of transmission, for releasing said locking means.

9. In a system of the character described, a pair of relatively axially adjustable pulley sections having inclined faces, forming by adjustment, variable effective pulley diameters, an axially adjustable barrel for adjusting the relative positions of the sections, an electric motor driving said pulley sections, and a circuit controller for starting the motor and operated to active position upon the arrival of the barrel at a definite axial position.

10. In a system of the character described, a pair of relatively axially adjustable pulley sections having inclined faces, forming by adjustment, variable effective pulley diameters, an axially adjustable barrel for adjusting the relative positions of the sections, an electric motor driving said pulley sections, and a circuit controller for starting the motor and operated to active position upon the arrival of the barrel at a definite axial position, corresponding to minimum ratio of transmission from the motor to the pulley sections.

11. In a variable diameter pulley structure, a pair of relatively axially adjustable sections having inclined faces, forming by adjustment, variable effective pulley diameters, means for adjusting the axial position of one of the sections comprising a resilient member exerting a force in a direction axial to the said section, an adjustable member acting on one end of the resilient member, a support guided for movement in said adjustable member for the said section, the other end of the resilient member urging said support in its guide, and means for holding the adjustable member in any adjusted position.

12. In a variable diameter pulley structure, a pair of axially adjustable sections having inclined faces, forming by adjustment variable effective pulley diameters, means for adjusting the axial position of one of the sections comprising a barrel having an external thread for adjusting it in an axial direction, a compression spring in the barrel, a thrust bearing for said section in the barrel urged by the spring toward an abutting surface in the barrel, and means for holding the barrel in adjusted position.

13. In a variable diameter pulley structure, a pair of relatively axially adjustable sections having inclined faces forming by adjustment variable effective pulley diameters, an axially movable member for mechanically moving one of said sections, adjusting means operable during standstill of the pulley structure for determining the axial position of said member, and means active upon rotation of said pulley structure for moving said member to the axial position determined by said adjusting means.

14. In a variable diameter pulley structure, a pair of relatively axially adjustable sections having inclined faces forming by adjustment variable effective pulley diameters, an axially movable member for mechanically moving one of said sections, a mechanically adjustable member, a resilient member between the axially movable member and the mechanically adjustable member, and means for holding said adjustable member in any adjusted position.

15. In an adjustable ratio power transmission device, a driving pulley structure, a driven pulley structure, a belt in active driving relation to said pulley structures, said driven pulley structure having an adjustable effective diameter and including a pair of pulley sections, forming by relative axial adjustment variable effective pulley diameters, a load driving shaft driven by said driven pulley structure, a brake for the load driving shaft, means for urging said brake to inoperative position, an electric motor in driving relation to said power transmission device, means for connecting said electric motor to a source of power supply, and means responsive to an application of the brake for interrupting said connecting means.

16. In an adjustable ratio power transmission, a pair of pulley structures, a belt in active power transmitting relation to said pulley structures, one of said pulley structures having a pair of pulley sections with opposed inclined belt engaging faces, forming by relative axial adjustment variable effective pulley diameters, means for adjusting the relative axial position of said pulley sections, speed ratio adjusting means for actuating said axially adjusting means, and adjustment transmitting means interposed between said speed ratio adjusting means and said axially adjusting means, whereby the total adjustment initiated by said speed ratio adjusting means is transmitted to said axially adjusting means when the force opposing the action of said axially adjusting means falls below a fixed predetermined minimum.

17. The combination as set forth in claim 22, in which the total motion transmitted by said adjustment transmitting means upon completion of the adjusting period, is fixed in direction and amount by said speed ratio adjusting means.

18. In a variable diameter pulley structure, a pair of relatively axially adjustable pulley sections having inclined faces, forming by adjustment variable effective pulley diameters, an axially movable members for moving one of said sections, and means for determining the adjusting movement of said member; comprising an adjusting means operable during standstill of the pulley structure, and means active upon rotation of the pulley structure for moving said axially movable member to the axial position determined by said adjusting means.

19. In a variable diameter pulley structure, a pair of relatively axially adjustable pulley sections having inclined faces, forming by adjustment variable effective pulley diameters, adjusting means operable during standstill of the pulley structure for presetting the relative axial position of said pulley sections, and means active upon rotation of said pulley structure for adjusting said pulley sections to the relative axial position determined by said adjusting means and for holding said pulley sections at the adjusted relative axial position.

20. In a variable diameter pulley structure, a pair of relatively axially adjustable pulley sections having inclined faces, forming by adjustment variable effective pulley diameters, means for adjusting the relative axial position of said pulley sections comprising; an axially movable member for moving one of said sections, a yielding force transmitting means for moving said axially movable member, and an adjustable member acting on said yielding force transmitting means, whereby the total adjustment initiated by said adjustable member is transmitted in direction and amount to said axially movable member upon rotation of the pulley structure.

21. In an adjustable speed drive, a driving pulley structure, a driven pulley structure, a belt in active driving relation to said pulley structures, one of said pulley structures having an adjustable effective diameter and including a pair of pulley sections having opposed inclined faces forming by relative axial adjustment variable effective pulley diameters, and means for adjusting the axial position of one of said pulley sections; comprising an adjusting means for determining the axial position of said one pulley section, and means active upon rotation of said pulley structure for moving said pulley section to the axial position determined by said adjusting means.

22. In an adjustable speed drive system, an adjustable ratio power transmission device, an electric motor for supplying power to said device, an adjusting means for pre-setting said transmission for operation at a predetermined speed ratio, means for connecting said electric motor to a source of power supply, releasable locking means for preventing the operation of said connecting means, and means actuated upon adjustment of the speed ratio to said predetermined value for releasing said locking means.

23. In an adjustable speed drive system, an electric motor, an adjustable ratio power transmission device arranged to be driven by said motor, adjusting means for presetting said transmission device for operation at minimum speed ratio, means for connecting said electric motor to a source of power supply, releasable locking means for preventing the actuation of said connecting means, and means actuated upon adjustment of said adjustable ratio power transmission for minimum speed ratio operation for releasing said locking means.

24. In an adjustable speed drive system, an adjustable speed power transmission including a driving pulley structure, a driven pulley structure and a belt for transmitting power between said pulley structures, one of said pulley structures having an adjustable effective diameter and including a pair of relatively axially adjustable pulley sections, having inclined faces, forming by adjustment variable effective pulley diameters, adjusting means for adjusting the relative axial position of said pulley sections, an electric motor for driving said adjustable speed power transmission and a circuit controller for starting the motor and operated to active position upon the arrival of said adjusting means at a definite position corresponding to a definite ratio of transmission.

25. In an adjustable speed drive system, an adjustable ratio power transmission including a driving pulley structure, a driven pulley structure and a belt for transmitting power between said pulley structures, one of said pulley structures having an adjustable effective diameter and including a pair of pulley sections having opposed inclined faces, forming by relative axial adjustment variable effective pulley diameters, speed ratio adjusting means for adjusting the relative axial position of said pulley sections, an electric motor in driving relation to said power transmission, a circuit controller for starting the motor and operated to active position upon the arrival of said speed ratio adjusting means at a definite position, corresponding to a minimum speed ratio of the adjustable speed transmission.

FRANK MASON.
GEORGE T. PFLEGER.